US011835759B2

(12) United States Patent
Matsubara et al.

(10) Patent No.: US 11,835,759 B2
(45) Date of Patent: Dec. 5, 2023

(54) OPTICAL WAVEGUIDE CIRCUIT

(71) Applicant: FURUKAWA ELECTRIC CO., LTD., Tokyo (JP)

(72) Inventors: Noritaka Matsubara, Tokyo (JP); Junichi Hasegawa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 295 days.

(21) Appl. No.: 17/401,175

(22) Filed: Aug. 12, 2021

(65) Prior Publication Data

US 2021/0373234 A1 Dec. 2, 2021

Related U.S. Application Data

(63) Continuation of application No. PCT/JP2020/004433, filed on Feb. 5, 2020.

(30) Foreign Application Priority Data

Feb. 14, 2019 (JP) .................................. 2019-024922

(51) Int. Cl.
*G02B 6/125* (2006.01)
*G02B 6/12* (2006.01)
*G02B 6/293* (2006.01)

(52) U.S. Cl.
CPC ......... *G02B 6/12007* (2013.01); *G02B 6/125* (2013.01); *G02B 6/29338* (2013.01)

(58) Field of Classification Search
None
See application file for complete search history.

(56) References Cited

U.S. PATENT DOCUMENTS

| 3,558,213 A | 1/1971 | Marcatili |
| 2008/0123188 A1 | 5/2008 | Klein et al. |
| 2013/0236136 A1 | 9/2013 | Nara et al. |

FOREIGN PATENT DOCUMENTS

| GB | 2 058 346 A | 4/1981 |
| JP | 47-37460 | 9/1972 |

(Continued)

OTHER PUBLICATIONS

International Search Report dated Mar. 10, 2020 in PCT/JP2020/004433 filed Feb. 5, 2020, 2 pages.

(Continued)

*Primary Examiner* — Chad H Smith
(74) *Attorney, Agent, or Firm* — Oblon, McClelland, Maier & Neustadt, L.L.P.

(57) ABSTRACT

An optical waveguide circuit includes: a ring waveguide; an input connection waveguide; an output connection waveguide; and an optical multiplexing/demultiplexing part that optically connects the ring waveguide with the input connection waveguide, and that optically connects the ring waveguide with the output connection waveguide. Further, at least one of the input connection waveguide and the output connection waveguide includes a plurality of curved waveguides, a sum total of products of curvature signs and bending angles of the curved waveguides and a sum total of a curvature sign and a bending angle of the ring waveguide have a same absolute value with signs opposite to each other, and rotation of a polarization plane of light generated in the ring waveguide and rotation of a polarization plane of light generated in the curved waveguides cancel each other out.

13 Claims, 5 Drawing Sheets

(56) References Cited

FOREIGN PATENT DOCUMENTS

| | | | |
|---|---|---|---|
| JP | 4-241304 | A | 8/1992 |
| JP | 5-181028 | A | 7/1993 |
| JP | 5-323390 | A | 12/1993 |
| JP | 2003-66253 | A | 3/2003 |
| JP | 2005-242141 | A | 9/2005 |
| JP | 2005242141 | A * | 9/2005 |
| JP | 5959505 | B2 | 8/2016 |
| WO | WO2008/129571 | A1 | 10/2008 |

OTHER PUBLICATIONS

Notice of Reasons for Rejection dated Jul. 20, 2021 in corresponding Japanese Application No. 2019-024922, therein, 12 pages (with English Translation).
Combined Chinese Office Action and Search Report dated Oct. 26, 2022 in Patent Application No. 202080014013.8 (with English machine translation and English translation of Category of Cited Documents), 14 pages.
Francesco Morichetti, et al., "Effects of Polarization Rotation in Optical Ring-Resonator-Based Devices," Journal of Lightwave Technology, vol. 24, No. 1, Jan. 2006, pp. 573-585.

* cited by examiner

OPTICAL WAVEGUIDE CIRCUIT

CROSS-REFERENCE TO RELATED APPLICATION(S)

This application is a continuation of International Application No. PCT/JP2020/004433, filed on Feb. 5, 2020 which claims the benefit of priority of the prior Japanese Patent Application No. 2019-024922, filed on Feb. 14, 2019, the entire contents of which are incorporated herein by reference.

BACKGROUND

The present disclosure relates to an optical waveguide circuit including a ring waveguide.

There is an optical waveguide circuit used for optical communication, which includes a ring waveguide and maintains and outputs the polarization state of input light. This type of optical waveguide circuit is configured with a ring waveguide, an optical multiplexer/demultiplexer, an input connection waveguide, and an output connection waveguide. The ring waveguide is formed by an arc-shaped curved waveguide. The light transmission intensity of this type of optical waveguide circuit exhibits wavelength dependency with periodic intervals (Free Spectral Range: FSR). "FSR" is expressed as "FSR=c/nL", where "c" is the velocity of light, "L" is the waveguide length of the ring waveguide, and "n" is the effective refractive index of the ring waveguide. It is possible to set FSR as desired by adjusting the ring waveguide length. Optical filters exhibiting various transmittance properties are used for optical communication, and a part thereof can be implemented by applying a ring resonator.

Polarization multiplexed signals are used in the recent optical communication technology, and the optical waveguide circuit is required to have a property that maintains and outputs the input polarization (referred to as a polarization maintaining property). However, the polarization maintaining property may be lost in actual optical waveguide circuits due to following reasons.

In an optical waveguide formed on a substrate, there is anisotropic stress to a waveguide section. This is because a structure formed with a cladding and a core is spread in a plan shape in the horizontal direction of a substrate face, but the structure in the perpendicular direction of the substrate face is generally thinner than that of the horizontal direction so that the stress imposed upon the waveguide for each of the directions varies. Furthermore, in a case where the thermal expansion coefficients of the substrate, the lower cladding, the core, and the upper cladding configuring the waveguide vary and if a high-temperature heat treatment of 1000° C. or higher, for example, is performed in a waveguide manufacturing step, thermal stress is generated in the waveguide during its cooling process. Furthermore, if the fabrication method of the upper cladding is Flame Hydrolysis Deposition (FHD), the volume greatly changes in the process of depositing a porous body made of fine particles and transparent vitrification and, in some cases, stress large enough to deform the core may be generated. Such stress is anisotropic, which may cause a vibration plane of each polarization mode (vibrating direction is referred to as polarization principal axis, vibration plane is referred to as polarization plane) to be tilted with respect to the substrate face. This is an issue for the optical waveguide circuit that is required to have the polarization maintaining property to maintain and output the input polarization.

Therefore, when light of transverse electric (TE) polarization (polarization in the parallel direction with respect to the substrate face) is input to the optical waveguide circuit, light of transverse magnetic (TM) polarization may be generated. Note here that the TM-polarization means the polarization in the perpendicular direction with respect to the substrate face. That is, the light of TM-polarization not existed at the time of input is generated, and the intensity of the light of TE-polarization is decreased. This phenomenon is called polarization coupling, which in this case can be expressed with a polarization mode coupling amount that is acquired by dividing the TM-polarization component intensity by the TE-polarization component intensity. In the usage where the polarization is to be maintained, it is preferable to have a higher polarization maintaining property. That is, it is preferable to have a smaller polarization mode coupling amount, and −20 dB or less is generally desired.

Japanese Patent No. 5959505 discloses a technique in which curved sections having the curvature of reverse signs, equivalent curvature radius, and equivalent arc angle are combined so as to cancel out rotations of the polarization planes of light generated in the curved sections.

SUMMARY

There is a need for providing an optical waveguide circuit in which both high flexibility in designing FSR of the ring resonator and low bending loss while securing a high polarization maintaining property can be realized.

According to an embodiment, an optical waveguide circuit includes: a ring waveguide; an input connection waveguide; an output connection waveguide; and an optical multiplexing/demultiplexing part that optically connects the ring waveguide with the input connection waveguide, and that optically connects the ring waveguide with the output connection waveguide. Further, at least one of the input connection waveguide and the output connection waveguide includes a plurality of curved waveguides, a sum total of products of curvature signs and bending angles of the curved waveguides and a sum total of a curvature sign and a bending angle of the ring waveguide have a same absolute value with signs opposite to each other, and rotation of a polarization plane of light generated in the ring waveguide and rotation of a polarization plane of light generated in the curved waveguides cancel each other out.

DETAILED DESCRIPTION

In the related art, following issues may arise when the curved sections having the curvature of reverse signs, equivalent curvature radius, and equivalent arc angle are combined in the optical waveguide circuit including the ring waveguide, the optical multiplexer/demultiplexer, the input connection waveguide, and the output connection waveguide in order to implement a high polarization maintaining property. That is, as the property of the curved sections, combinations of the signs of curvature, the curvature radii, and the arc angles are limited so that it may not be possible to design FSR of the ring resonator freely. On the other hand, when the property of the curved sections is determined to have a desired value for FSR of the ring resonator, it is necessary to provide curved sections in the input connection waveguide and the output connection waveguide accordingly, which may cause excessive bending loss in the curved sections.

Hereinafter, embodiments will be described with reference to the accompanying drawings. Note that the present disclosure is not limited by the embodiments. In the accompanying drawings, same reference signs are applied to the same or corresponding elements as appropriate. Furthermore, it is to be noted that the drawings are schematically illustrated and dimensional relations, ratios, and the like of each of the elements may be different from those of actual ones. Furthermore, between each of the drawings, there may be a part having a different dimensional relation and ratio with respect to each other.

First Embodiment

Figure 1:
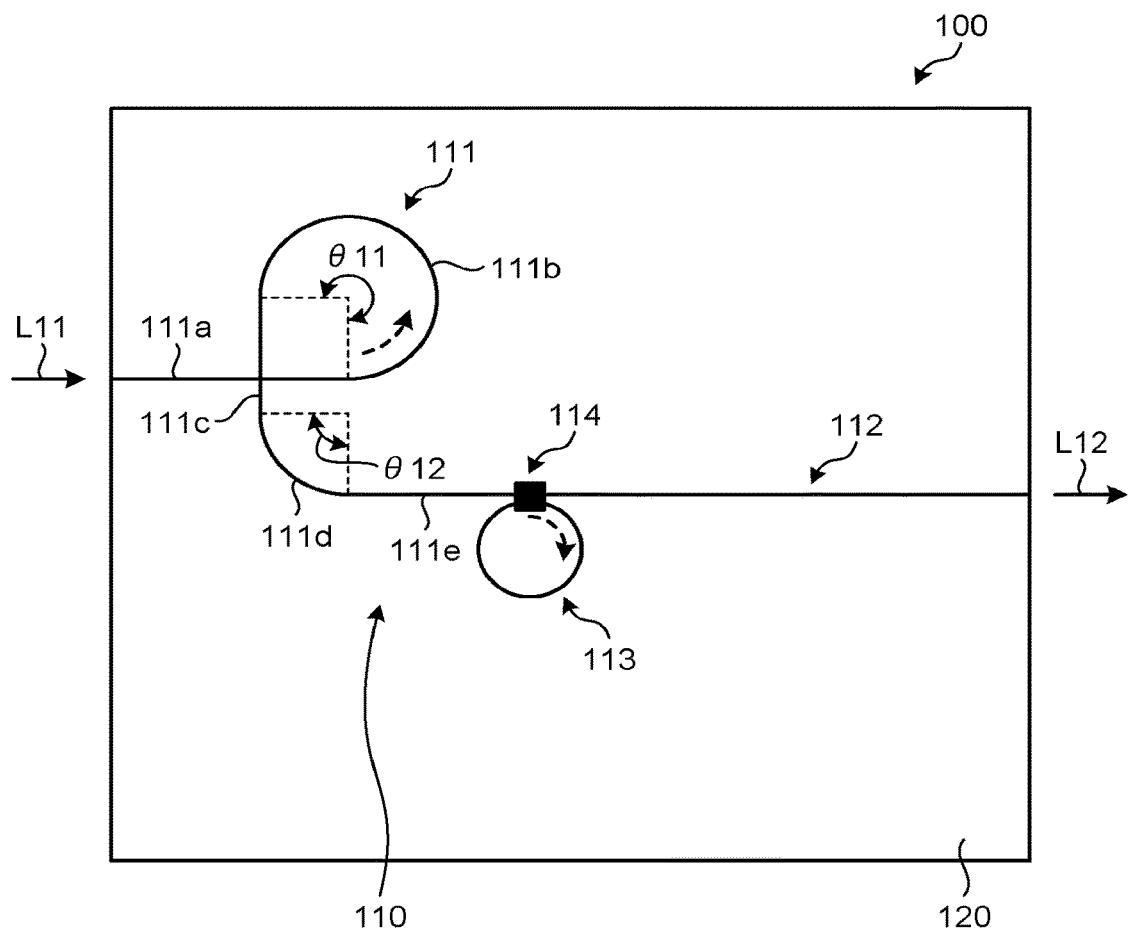
FIG. 1 is a schematic view of an optical waveguide circuit according to a first embodiment.

FIG. 1 is a schematic view of an optical waveguide circuit according to a first embodiment. An optical waveguide circuit 100 is configured with a planar lightwave circuit (PLC) that includes an optical waveguide 110 configured with a core and a cladding 120.

Figure 2:
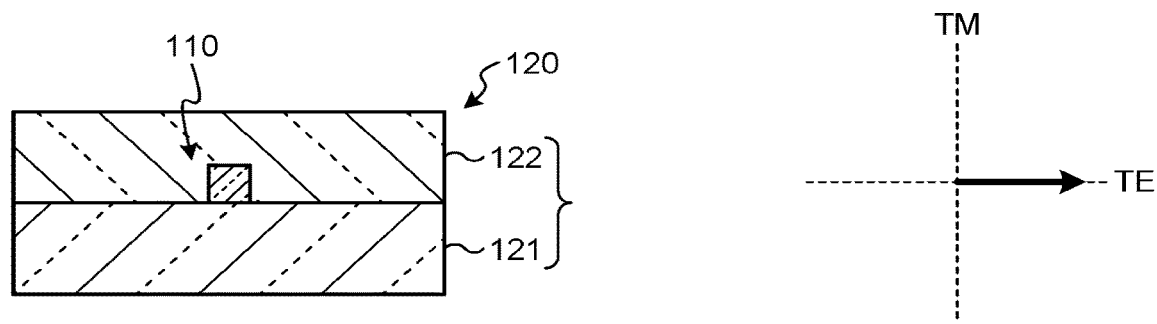
FIG. 2 is a fragmentary sectional view of the optical waveguide circuit illustrated in FIG. 1.

FIG. 2 is a fragmentary sectional view of the optical waveguide circuit 100. The cladding 120 surrounds the optical waveguide 110, and includes a lower cladding 121 and an upper cladding 122. The cladding 120 is formed on a silicon substrate or a glass substrate, for example. The cladding 120 is formed with a silica-based glass material. As illustrated, TE-polarization is the polarization in a parallel direction with respect to the substrate face, and TM-polarization is the polarization in a perpendicular direction with respect to the substrate face.

The optical waveguide 110 is formed with a silica-based glass material having a higher refractive index than that of the cladding 120. As such a silica-based glass material having a high refractive index, it is possible to use silica glass containing germania ($GeO_2$) or zirconia ($ZrO_2$) as dopant for increasing the refractive index, for example. Especially, with the so-called $SiO_2$—$ZrO_2$ based material that is silica glass containing zirconia, a relative refractive-index difference of the optical waveguide 110 with respect to the cladding 120 can be increased to be 4.5% or more, for example. Therefore, it is preferable when reducing the size of the optical waveguide circuit 100. The optical waveguide 110 configured with the core is a buried waveguide buried in the cladding 120.

In the embodiment, it is assumed that the relative refractive-index difference of the optical waveguide 110 with respect to the cladding 120 is 4.5%.

Returning to FIG. 1, the optical waveguide 110 includes an input connection waveguide 111, an output connection waveguide 112, a ring waveguide 113, and an optical multiplexer/demultiplexer 114 as an optical multiplexing/demultiplexing part.

The ring waveguide 113 is in a circular shape having a specific radius. The input connection waveguide 111 includes a plurality of curved waveguides. Specifically, the input connection waveguide 111 is configured with a straight waveguide 111a, a curved waveguide 111b, a straight waveguide 111c, a curved waveguide 111d, and a straight waveguide 111e. One end of the input connection waveguide 111 is extended toward the side face of the optical waveguide circuit 100 on the left side of the drawing.

The output connection waveguide 112 is configured with a straight waveguide. One end of the output connection waveguide 112 is extended toward the side face of the optical waveguide circuit 100 on the right side of the drawing.

The optical multiplexer/demultiplexer 114 optically connects the ring waveguide 113 with the input connection waveguide 111 and the ring waveguide 113 with the output connection waveguide 112. The optical multiplexer/demultiplexer 114 is a 2×2 type with two ports on the input side and two ports on the output side, and examples thereof may be a directional coupling type and a multimode interference (MMI) type.

The curvature radii of the curved waveguide 111b and the curved waveguide 111d are different from the curvature radius of the ring waveguide 113. For example, the curvature radii of the curved waveguide 111b and the curved waveguide 111d are 250 µm. The curvature radius of the ring waveguide 113 is 206 µm.

Furthermore, the light guiding direction of the curved waveguide 111b and the curved waveguide 111d is counterclockwise as indicated by an arrow, and the curvature sign is negative. A bending angle θ11 of the curved waveguide 111b is 270 degrees. A bending angle θ12 of the curved waveguide 111d is 90 degrees. Therefore, the sum total of the products of the curvature signs and the bending angles of the curved waveguide 111b and the curved waveguide 111d is −360 degrees.

Meanwhile, the light guiding direction of the ring waveguide 113 is clockwise as indicated by an arrow, and the curvature sign is positive. The bending angle of the ring waveguide 113 is 360 degrees. Therefore, the sum total of the product of the curvature sign and the bending angle of the ring waveguide 113 is 360 degrees. It is to be noted that the sum total of the product of the curvature sign and the bending angle of the ring waveguide 113 is not the sum total from the optical multiplexing/demultiplexing part on the input side to the optical multiplexing/demultiplexing part on the output side but the sum total of the product of the curvature sign and the bending angle of the entire (a circle of) ring waveguide 113.

As described, the sum total of the products of the curvature signs and the bending angles of the curved waveguide 111b and the curved waveguide 111d and the sum total of the product of the curvature sign and the bending angle of the ring waveguide 113 have the same absolute value with opposite signs. Thereby, rotation of the polarization plane of light generated in the ring waveguide 113 and rotation of the polarization plane of light generated in the curved waveguide 111b and the curved waveguide 111d cancel each other out.

Therefore, assuming that light L11 input from the input connection waveguide 111 is TE-polarized light of single polarization, light L12 output from the output connection waveguide 112 is also substantially the TE-polarized light. Therefore, a high polarization maintaining property is secured. Similarly, in a case where the light L11 is TM-polarized light, the light L12 is also substantially the TM-polarized light so that a high polarization maintaining property is secured.

Figure 3:
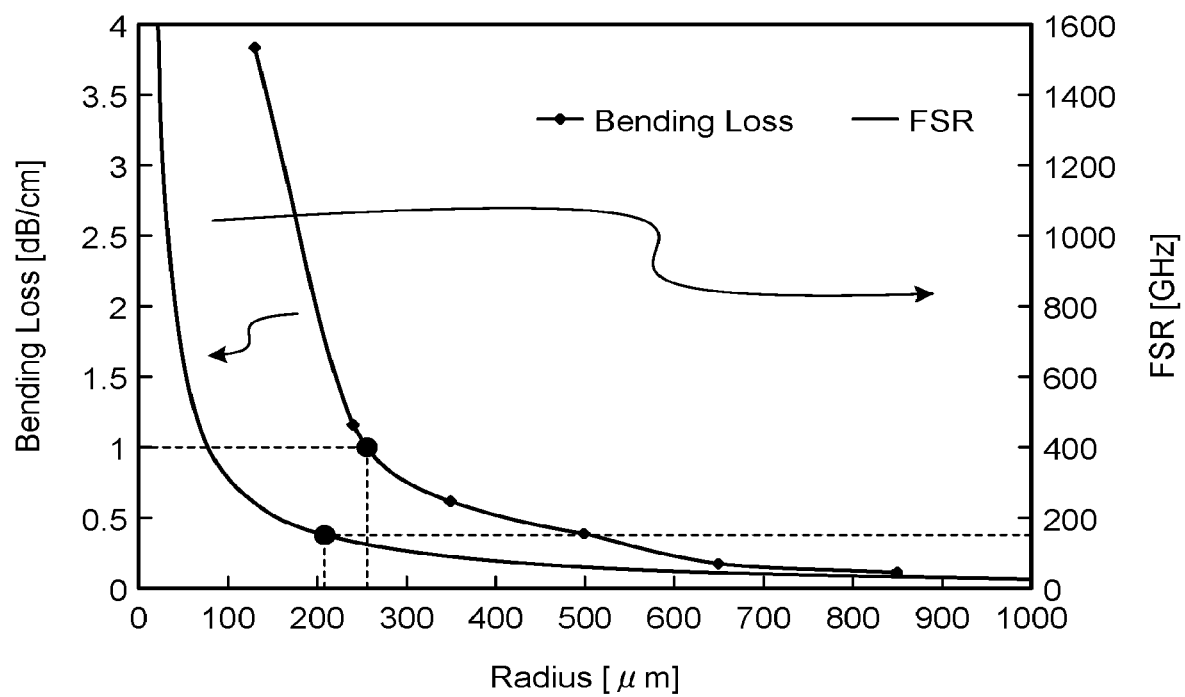
FIG. 3 is a chart illustrating an example of a relation in regards to the bending radius, the bending loss, and FSR.

FIG. 3 is a chart illustrating an example of the relation in regards to the bending radius (Radius), the bending loss (Bending Loss), and FSR. In the optical waveguide circuit 100, the curvature radii of the curved waveguide 111b and the curved waveguide 111d are different from the curvature radius of the ring waveguide 113, so that each of those can be set as an optimal value. For example, by setting the curvature radius of the ring waveguide 113 as 206 μm, FSR can be designed to be 150 GHz. Furthermore, by setting the curvature radii of the curved waveguide 111b and the curved waveguide 111d as 250 μm, it is possible to decrease light loss (mainly bending loss) through the waveguides to be about 1 dB/cm or less and to reduce the size of the optical waveguide circuit 100.

For example, FIG. 3 is a chart illustrating an example of the relation in regards to the bending radius (Radius), the bending loss (Bending Loss), and FSR.

In a case of a technique in which curved sections having the curvatures of reverse signs, equivalent curvature radii, and equivalent arc angles are combined as disclosed in Japanese Patent No. 5959505, when the curvature radii of the curved waveguide 111b and the curved waveguide 111d are set as 250 μm, it is necessary to set the curvature radius of the ring waveguide 113 as 250 μm. In this case, while the bending loss can be set as 1 dB/cm, FSR is fixed as 124 GHz. Meanwhile, when the curvature radius of the ring waveguide 113 is set as 206 μm so as to set FSR as 150 GHz, it is necessary to set the curvature radii of the curved waveguide 111b and the curved waveguide 111d as 206 μm as well. In this case, the light loss is increased than the case of setting the curvature radii of the curved waveguide 111b and the curved waveguide 111d as 250 μm, and the bending loss exceeds 1 dB/cm.

As described above, with the optical waveguide circuit 100, it is possible to implement both high flexibility in designing FSR of the ring waveguide 113 and low bending loss while securing a high polarization maintaining property. Note that the curvature radii and the bending angles mentioned above are examples, and it is possible to set the values thereof freely in accordance with the required bending loss and FSR.

The optical waveguide circuit 100 can be manufactured through following steps, for example. First, using the FHD method, fine particles of silica-based glass are deposited on a substrate, heat is applied thereto to make the glass fine particles to transparent glass so as to form the lower cladding 121. Then, a silica-based glass fine particle layer to be a core is deposited on the lower cladding 121 by sputtering. At this time, $ZrO_2$ is added to $SiO_2$ to make the refractive index of the silica-based glass fine particle layer to be the core higher than that of the cladding such that the relative refractive-index difference between the core and the cladding becomes 4.5°. Then, an etching mask made with resist is formed by photolithography using a photomask having a circuit pattern of the optical waveguide 110 of the optical waveguide circuit 100. Subsequently, by using an etching gas such as a fluorine-based gas, dry etching is performed on the silica-based glass fine particle layer not covered by the etching mask. Finally, using the FHD method, fine particles of silica-based glass are deposited, heat is applied thereto to make the glass fine particles to transparent glass so as to form the upper cladding 122 that configures the upper part of the cladding 120. In the manner described above, the optical waveguide circuit 100 can be manufactured.

As a first example, an optical waveguide circuit having the configuration of the optical waveguide circuit 100 was manufactured by the manufacturing method described above. The property of the manufactured optical waveguide circuit was measured, and FSR was 150 GHz. Furthermore, when TE-polarized light was input from an input connection waveguide and the polarization mode coupling amount was measured, a preferable value of −25 dB or less was acquired. Moreover, when a curved waveguide part of the input connection waveguide was diced and the light loss thereof was measured, acquired was a preferable value of 0.95 dB/cm or less.

As a first comparative example, an optical waveguide circuit having the same configuration as that of the first example was manufactured except that the curvature radii of the two curved waveguides of the input connection waveguide and the ring waveguide were all set as 250 μm. While the polarization mode coupling amount was a preferable value of −25 dB or less, acquired FSR was not 150 GHz as desired but 124 GHz.

Furthermore, as a second comparative example 2, an optical waveguide circuit having the same configuration as that of the first example was manufactured except that a single S-shaped curved waveguide was provided between two straight waveguides for each of the input connection waveguide and the output connection waveguide and that the curvature radii of the S-like curved waveguides and the ring waveguide were all set as 250 μm. In this case, rotation of the polarization plane of light generated in each of the input connection waveguide and the output connection waveguide is canceled within the S-like curved waveguide. However, when the property of the optical waveguide circuit was measured, acquired was the polarization mode coupling amount of −13 dB, which is not a proper value for practical use.

Second Embodiment

Figure 4:
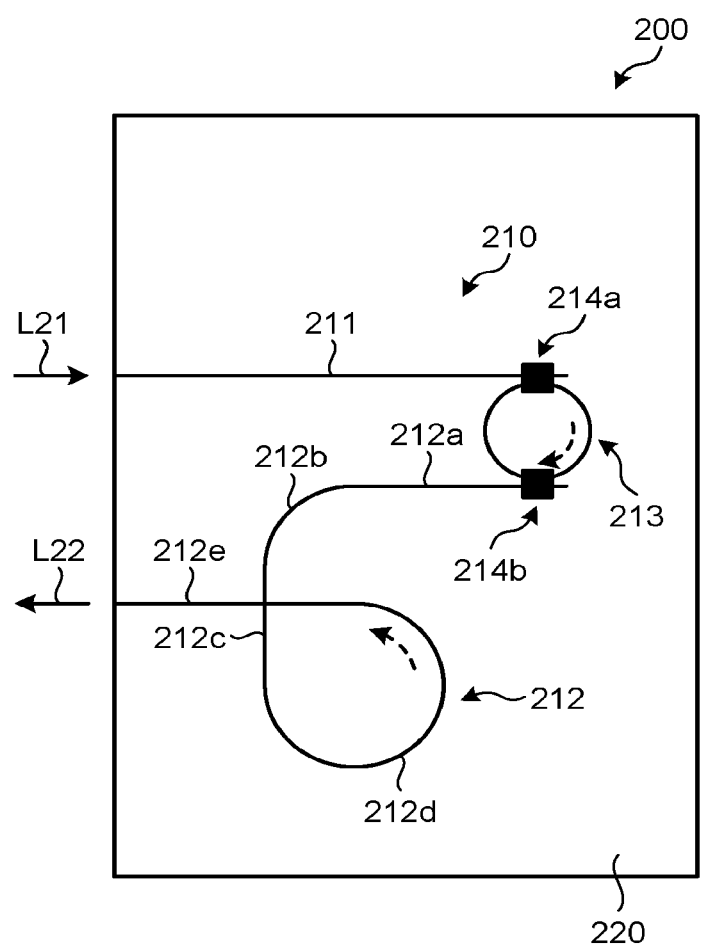
FIG. 4 is a schematic view of an optical waveguide circuit according to a second embodiment.

FIG. 4 is a schematic view of an optical waveguide circuit according to a second embodiment. An optical waveguide circuit 200 is configured with a PLC that includes an optical waveguide 210 configured with a core and a cladding 220.

The sectional structure of the optical waveguide circuit 200, the materials of the optical waveguide 210 and the cladding 220, and the relative refractive-index difference thereof may be the same as those of the corresponding elements of the optical waveguide circuit 100 according to the first embodiment.

The optical waveguide 210 includes an input connection waveguide 211, an output connection waveguide 212, a ring waveguide 213, and two optical multiplexers/demultiplexers 214a and 214b configuring optical multiplexing/demultiplexing parts.

The ring waveguide 213 is in a circular shape having a specific radius. The input connection waveguide 211 is configured with a straight waveguide. One end of the input connection waveguide 211 is extended toward the side face of the optical waveguide circuit 200 on the left side of the drawing.

The output connection waveguide 212 includes a plurality of curved waveguides. Specifically, the output connection waveguide 212 is configured with a straight waveguide 212a, a curved waveguide 212b, a straight waveguide 212c, a curved waveguide 212d, and a straight waveguide 212e. One end of the output connection waveguide 212 is extended toward the side face of the optical waveguide circuit 200 on the left side of the drawing. That is, one end of the input connection waveguide 211 and one end of the output connection waveguide 212 are extended toward the same side face.

The optical multiplexer/demultiplexer 214a optically connects the ring waveguide 213 with the input connection waveguide 211. The optical multiplexer/demultiplexer 214b optically connects the ring waveguide 213 with the output connection waveguide 212. The optical multiplexers/demultiplexers 214a and 214b are a 2×2 type that is a directional coupling type or an MMI type, for example.

The curvature radii of the curved waveguide 212b and the curved waveguide 212d are different from the curvature radius of the ring waveguide 213. For example, the curvature radii of the curved waveguide 212b and the curved waveguide 212d are 250 µm. The curvature radius of the ring waveguide 213 is 206 µm.

Furthermore, the light guiding direction of the curved waveguide 212b and the curved waveguide 212d is counterclockwise as indicated by an arrow, and the curvature sign is negative. The bending angle of the curved waveguide 212b is 90 degrees. The bending angle of the curved waveguide 212d is 270 degrees. Therefore, the sum total of the products of the curvature signs and the bending angles of the curved waveguide 212b and the curved waveguide 212d is −360 degrees.

Meanwhile, the light guiding direction of the ring waveguide 213 is clockwise as indicated by an arrow, and the curvature sign is positive. The bending angle of the ring waveguide 213 is 360 degrees. Therefore, the sum total of the product of the curvature sign and the bending angle of the ring waveguide 213 is 360 degrees.

As described, the sum total of the products of the curvature signs and the bending angles of the curved waveguide 212b and the curved waveguide 212d and the sum total of the product of the curvature sign and the bending angle of the ring waveguide 213 have the same absolute value with opposite signs. Thereby, rotation of the polarization plane of light generated in the ring waveguide 213 and rotation of the polarization plane of light generated in the curved waveguide 212b and the curved waveguide 212d cancel each other out. As a result, regardless of whether input light L21 is in TE-polarization or TM-polarization, light L22 is output while securing a high polarization maintaining property.

In the optical waveguide circuit 200, the curvature radii of the curved waveguide 212b and the curved waveguide 212d are different from the curvature radius of the ring waveguide 213, so that each of those can be set as an optimal value. For example, by setting the curvature radius of the ring waveguide 213 as 206 µm, FSR can be designed to be 150 GHz. Furthermore, by setting the curvature radii of the curved waveguide 212b and the curved waveguide 212d as 250 µm, it is possible to decrease light loss (mainly bending loss) through the waveguides to be about 1 dB/cm or less and to reduce the size of the optical waveguide circuit 200.

As described above, with the optical waveguide circuit 200, it is possible to implement both high flexibility in designing FSR of the ring waveguide 213 and low bending loss while securing a high polarization maintaining property. Note that the curvature radii and the bending angles mentioned above are examples, and it is possible to set the values thereof freely in accordance with the required bending loss and FSR. Furthermore, in the optical waveguide circuit 200, one end of the input connection waveguide 211 and one end of the output connection waveguide 212 are extended toward the same side face. Therefore, it is easily connected to an optical fiber array or another optical waveguide circuit.

As a second example, an optical waveguide circuit having the configuration of the optical waveguide circuit 200 was manufactured by the manufacturing method described above. The property of the manufactured optical waveguide circuit was measured, and FSR was 150 GHz. Furthermore, when TE-polarized light was input from an input connection waveguide and the polarization mode coupling amount was measured, a preferable value of −25 dB or less was acquired. Moreover, when a curved waveguide part of the output connection waveguide was diced and the light loss thereof was measured, acquired was a preferable value of 0.95 dB/cm or less.

Third Embodiment

Figure 5:
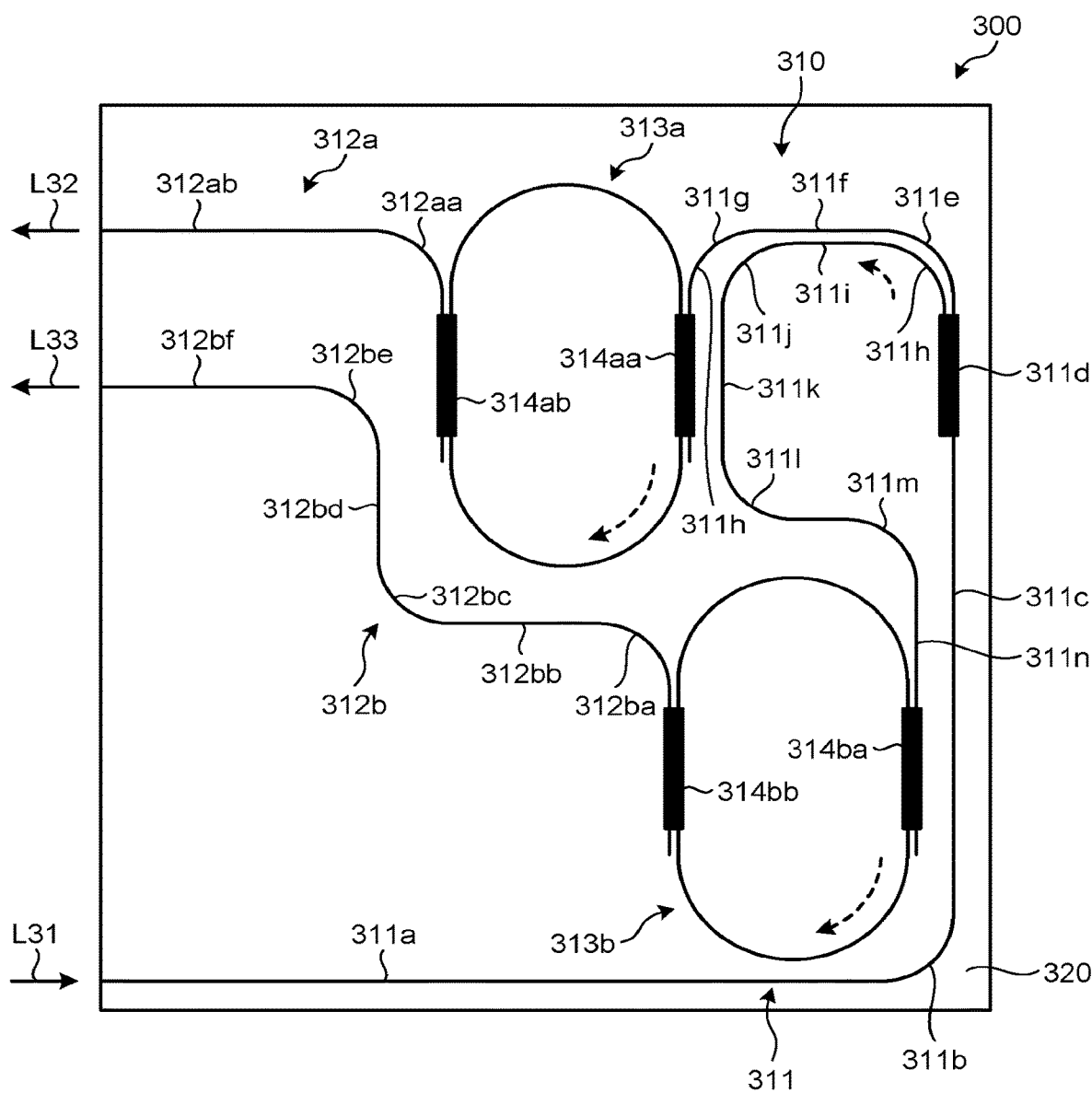
FIG. 5 is a schematic view of an optical waveguide circuit according to a third embodiment.

FIG. 5 is a schematic view of an optical waveguide circuit according to a third embodiment. An optical waveguide circuit 300 is configured with a PLC that includes an optical waveguide 310 configured with a core and a cladding 320.

The sectional structure of the optical waveguide circuit 300, the materials of the optical waveguide 310 and the cladding 320, and the relative refractive-index difference thereof may be the same as those of the corresponding elements of the optical waveguide circuit 100 according to the first embodiment.

The optical waveguide 310 includes: an input connection waveguide 311; two output connection waveguides 312a and 312b; a plurality of, two in the embodiment, ring waveguides 313a and 313b; and four optical multiplexers/demultiplexers 314aa, 314ab, 314ba and 314bb configuring the optical multiplexing/demultiplexing parts.

The ring waveguides 313a and 313b are formed including curved waveguides of a specific radius with a bending angle of 90 degrees, and formed in an elliptical shape including the optical multiplexers/demultiplexers 314aa, 314ab, 314ba, and 314bb. The waveguide lengths of the ring waveguides 313a and 313b are equivalent with each other, and the circulating directions of light are also the same with respect to each other as indicated by arrows.

The input connection waveguide 311 includes a plurality of curved waveguides and a branch part. Specifically, the input connection waveguide 311 is configured with a straight waveguide 311a, a curved waveguide 311b, a straight waveguide 311c, a branch part 311d, a curved waveguide 311e, a straight waveguide 311f, a curved waveguide 311g, a curved waveguide 311h, a straight waveguide 311i, a curved waveguide 311j, a straight waveguide 311k, a curved waveguide 311l, a curved waveguide 311m, and a straight waveguide 311n. One end of the input connection waveguide 311 is extended toward the side face of the optical waveguide circuit 300 on the left side of the drawing. The branch part 311d branches the input connection waveguide 311. The curved waveguide 311e, the straight waveguide 311f, and the curved waveguide 311g configure a first branched path that is branched from the branch part 311d and optically connected to the ring waveguide 313a. The first branched path includes the two curved waveguides 311e and 311g. The curved waveguide 311h, the straight waveguide 311i, the curved waveguide 311j, the straight waveguide 311k, the curved waveguide 311l, the curved waveguide 311m, and the straight waveguide 311n configure a second branched path that is branched from the branch part 311d and optically connected to the ring waveguide 313b. The second branched path includes the four curved waveguides 311h, 311j, 311l, and 311m. While the light branching ratio at the branch part 311d is 1:1, for example, there is no specific limit set thereto. The branch part 311d is a 1×2 type that is a directional coupling type or an MMI type, for example.

The curved waveguide 311l and the curved waveguide 311m are continuous, but the signs of the curvatures are different. Therefore, those can be considered as individual curved waveguides. In the current description, two continuous curved waveguides are considered as individual curved waveguides if the signs of curvatures or the curvature radii thereof are different.

The output connection waveguide 312a is configured with a curved waveguide 312aa and a straight waveguide 312ab. The output connection waveguide 312b is configured with a curved waveguide 312ba, a straight waveguide 312bb, a curved waveguide 312bc, a straight waveguide 312bd, a curved waveguide 312be, and a straight waveguide 312bf. One ends of the output connection waveguides 312a and 312b are extended toward the side face of the optical waveguide circuit 300 on the left side of the drawing. That is, one end of the input connection waveguide 311 and one ends of the output connection waveguides 312a and 312b are extended toward the same side face.

The optical multiplexer/demultiplexer 314aa optically connects the ring waveguide 313a and the curved waveguide 311g that configures the first branched path on the input connection waveguide 311. The optical multiplexer/demultiplexer 314ab optically connects the ring waveguide 313a and the curved waveguide 312aa of the output connection waveguide 312a. The optical multiplexer/demultiplexer 314ba optically connects the ring waveguide 313b and the straight waveguide 311n that configures the second branched path on the input connection waveguide 311. The optical multiplexer/demultiplexer 314bb optically connects the ring waveguide 313b and the curved waveguide 312ba of the output connection waveguide 312b. The optical multiplexers/demultiplexers 314aa, 314ab, 314ba, and 314bb are a 2×2 type that is a directional coupling type or an MMI type, for example.

The curvature radii of each of the curved waveguides of the input connection waveguide 311 and the output connection waveguides 312a and 312b are different from the curvature radii of the curved waveguides of the ring waveguides 313a and 313b. For example, the curvature radii of each of the curved waveguides of the input connection waveguide 311 and the output connection waveguides 312a and 312b are 250 μm. The curvature radii of the curved waveguides of the ring waveguides 313a and 313b are 412 μm.

As for the curved waveguides 311b, 311e, and 311g of the input connection waveguide 311 to the ring waveguide 313a, the light guiding direction is counterclockwise as indicated by an arrow, and the curvature signs are negative. The bending angles of each of the curved waveguides 311b, 311e, and 311g are 90 degrees. Therefore, the sum total of the products of the curvature signs and the bending angles of the curved waveguides 311b, 311e, and 311g is −270 degrees.

Meanwhile, the light guiding direction of the curved waveguide of the ring waveguide 313a is clockwise as indicated by an arrow, and the curvature sign is positive. The bending angle of the curved waveguide of the ring waveguide 313a is 360 degrees. Therefore, the sum total of the product of the curvature sign and the bending angle of the ring waveguide 313a is 360 degrees.

Furthermore, the light guiding direction of the curved waveguide 312aa of the output connection waveguide 312a is counterclockwise, the curvature sign is negative, and the bending angle is 90 degrees. Therefore, the sum total of the product of the curvature sign and the bending angle of the curved waveguide 312aa is −90 degrees.

As a result, the sum total of the products of the curvature signs and the bending angles of the curved waveguides 311b, 311e, 311g, and 312aa and the sum total of the product of the curvature sign and the bending angle of the ring waveguide 313a have the same absolute value with opposite signs. Thereby, rotation of the polarization plane of light generated in the ring waveguide 313a and rotation of the polarization plane of light generated in the curved waveguides 311b, 311e, 311g, and 312aa cancel each other out. As a result, regardless of whether input light L31 is in TE-polarization or TM-polarization, light L32 is output while securing a high polarization maintaining property.

Similarly, as for the curved waveguides 311b, 311h, 311j, 311l, and 311m of the input connection waveguide 311 to the ring waveguide 313b, the light guiding directions are counterclockwise or clockwise, and the curvature signs are negative or positive. The bending angles of each of the curved waveguides 311b, 311h, 311j, 311l, and 311m are 90 degrees. Therefore, the sum total of the products of the curvature signs and the bending angles of the curved waveguides 311b, 311h, 311j, 311l, and 311m is −270 degrees.

That is, the sum totals of the curvature signs and the bending angles of the curved waveguides in the first branched path and the second branched path are equivalent with each other.

Meanwhile, the light guiding direction of the curved waveguide of the ring waveguide 313b is clockwise as indicated by an arrow, and the curvature sign is positive. The bending angle of the curved waveguide of the ring waveguide 313b is 360 degrees. Therefore, the sum total of the product of the curvature sign and the bending angle of the ring waveguide 313b is 360 degrees.

Furthermore, as for the curved waveguides 312ba, 312bc, and 312be of the output connection waveguide 312b, the light guiding directions are counterclockwise or clockwise, the curvature signs are negative or positive, and the bending angles are 90 degrees. Therefore, the sum total of the products of the curvature signs and the bending angles of the curved waveguides 312ba, 312bc, and 312be is −90 degrees.

As a result, the sum total of the products of the curvature signs and the bending angles of the curved waveguides 311b, 311h, 311j, 311l, 311m, 312ba, 312bc, and 312be and the sum total of the product of the curvature sign and the bending angle of the ring waveguide 313b have the same absolute value with opposite signs. Thereby, rotation of the polarization plane of light generated in the ring waveguide 313b and rotation of the polarization plane of light generated in the curved waveguides 311b, 311h, 311j, 311l, 311m, 312ba, 312bc, and 312be cancel each other out. As a result, regardless of whether input light L31 is in TE-polarization or TM-polarization, light L33 is output while securing a high polarization maintaining property.

In the optical waveguide circuit 300, the curvature radii of each of the curved waveguides of the input connection waveguide 311 and the output connection waveguides 312a and 312b are different from the curvature radii of the ring waveguides 313a and 313b so that each of those can be set as an optimal value. For example, by setting the curvature radii of the ring waveguides 313a and 313b as 412 μm, FSR can be designed to be 75 GHz. Furthermore, by setting the curvature radii of each of the curved waveguides of the input connection waveguide 311 and the output connection waveguides 312a and 312b as 250 μm, it is possible to decrease light loss through the waveguides and to reduce the size of the optical waveguide circuit 300.

As described above, with the optical waveguide circuit 300, it is possible to implement both high flexibility in designing FSR and low bending loss while securing a high polarization maintaining property. Note that the curvature radii and the bending angles mentioned above are examples, and it is possible to set the values thereof freely in accordance with the required bending loss and FSR. Furthermore, in the optical waveguide circuit 300, one end of the input connection waveguide 311 and one ends of the output connection waveguides 312a and 312b are extended toward the same side face. Therefore, it is easily connected to an optical fiber array or another optical waveguide circuit.

As a third example, an optical waveguide circuit having the configuration of the optical waveguide circuit 300 was manufactured by the manufacturing method described above. The property of the manufactured optical waveguide circuit was measured, and FSR of a ring resonator configured with two ring waveguides was 75 GHz. Furthermore, when TE-polarized light was input from an input connection waveguide and the polarization mode coupling amount was measured, a preferable value of −25 dB or less was acquired. Moreover, when curved waveguide parts of the input connection waveguide and the output connection waveguide were diced and the light loss thereof was measured, acquired was a preferable value of 0.95 dB/cm or less.

Fourth Embodiment

Figure 6:
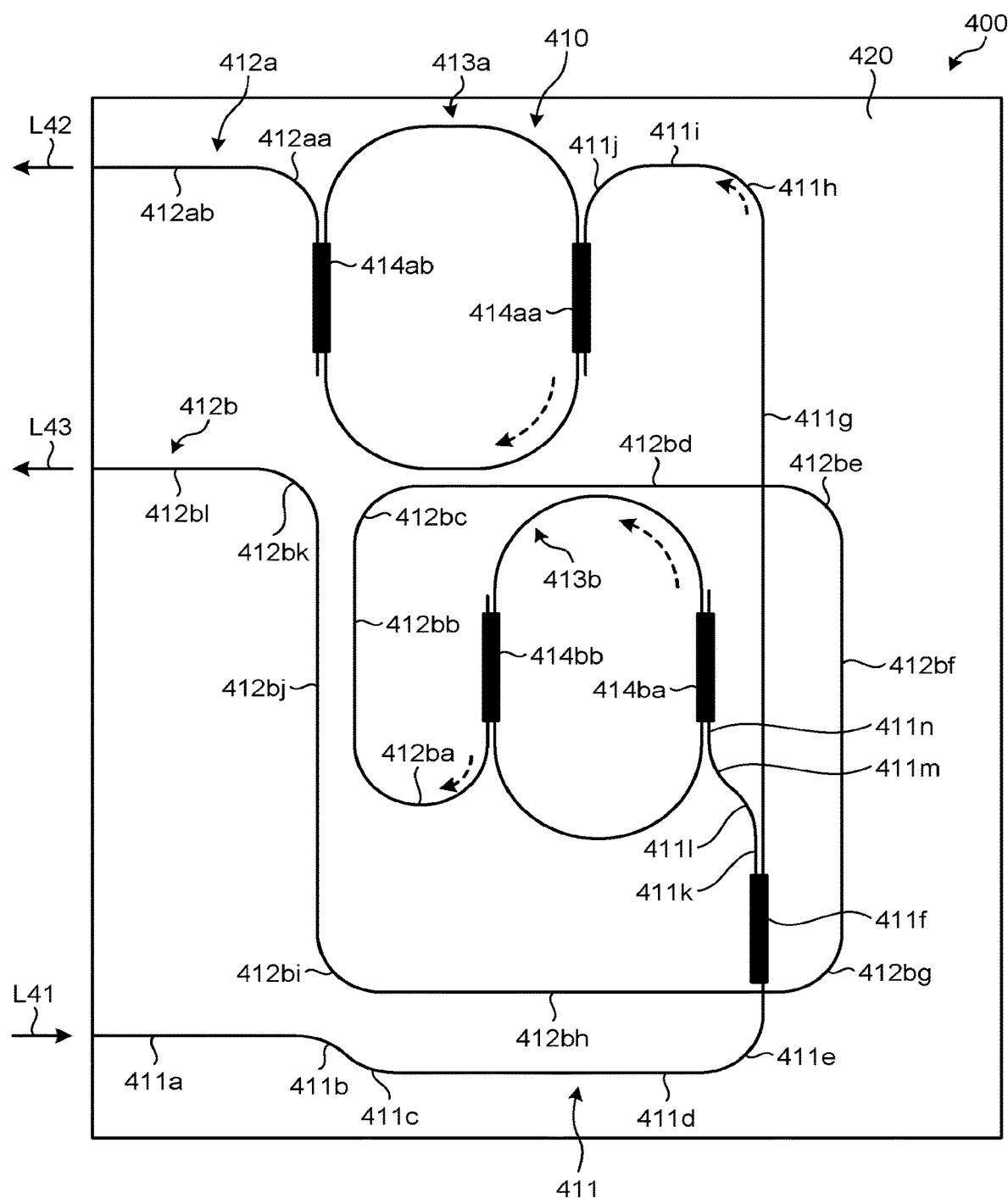
FIG. 6 is a schematic view of an optical waveguide circuit according to a fourth embodiment.

FIG. 6 is a schematic view of an optical waveguide circuit according to a fourth embodiment. An optical waveguide circuit 400 is configured with a PLC that includes an optical waveguide 410 configured with a core and a cladding 420.

The sectional structure of the optical waveguide circuit 400, the materials of the optical waveguide 410 and the cladding 420, and the relative refractive-index difference thereof may be the same as those of the corresponding elements of the optical waveguide circuit 100 according to the first embodiment.

The optical waveguide 410 includes: an input connection waveguide 411; two output connection waveguides 412a and 412b; a plurality of, two in the embodiment, ring waveguides 413a and 413b; and four optical multiplexers/demultiplexers 414aa, 414ab, 414ba and 414bb configuring the optical multiplexing/demultiplexing parts.

The ring waveguides 413a and 413b are formed including curved waveguides having a specific radius with a bending angle of 90 degrees, and formed in an elliptical shape including the optical multiplexers/demultiplexers 414aa, 414ab, 414ba, and 414bb. The ring waveguide 413b also includes a straight waveguide. Furthermore, the waveguide lengths of the ring waveguides 413a and 413b are different from each other, and the circulating directions of light are also different from each other as indicated by arrows.

The input connection waveguide 411 includes a plurality of curved waveguides and a branch part. Specifically, the input connection waveguide 411 is configured with a straight waveguide 411a, a curved waveguide 411b, a curved waveguide 411c, a straight waveguide 411d, a curved waveguide 411e, a branch part 411f, a straight waveguide 411g, a curved waveguide 411h, a straight waveguide 411i, a curved waveguide 411j, a straight waveguide 411k, a curved waveguide 411l, a curved waveguide 411m, and a straight waveguide 411n. One end of the input connection waveguide 411 is extended toward the side face of the optical waveguide circuit 400 on the left side of the drawing. The branch part 411f branches the input connection waveguide 411. The straight waveguide 411g, the curved waveguide 411h, the straight waveguide 411i, and the curved waveguide 411j configure a first branched path that is branched from the branch part 411f and optically connected to the ring waveguide 413a. The first branched path includes the two curved waveguides 411h and 411j. The straight waveguide 411k, the curved waveguide 411l, the curved waveguide 411m, and the straight waveguide 411n configure a second branched path that is branched from the branch part 411f and optically connected to the ring waveguide 413b. The second branched path includes the two curved waveguides 411l and 411m. While the light branching ratio at the branch part 411f is 1:1, for example, there is no specific limit set thereto. The branch part 411f is a 1×2 type that is a directional coupling type or an MMI type, for example.

The output connection waveguide 412a is configured with a curved waveguide 412aa and a straight waveguide 412ab. The output connection waveguide 412b is configured with a curved waveguide 412ba, a straight waveguide 412bb, a curved waveguide 412bc, a straight waveguide 412bd, a curved waveguide 412be, a straight waveguide 412bf, a curved waveguide 412bg, a straight waveguide 412bh, a curved waveguide 412bi, a straight waveguide 412bj, a curved waveguide 412bk, and a straight waveguide 412bl. One ends of the output connection waveguides 412a and 412b are extended toward the side face of the optical waveguide circuit 400 on the left side of the drawing. That is, one end of the input connection waveguide 411 and one ends of the output connection waveguides 412a and 412b are extended toward the same side face.

The optical multiplexer/demultiplexer 414aa optically connects the ring waveguide 413a and the curved waveguide 411j that configures the first branched path on the input connection waveguide 411. The optical multiplexer/demultiplexer 414ab optically connects the ring waveguide 413a and the curved waveguide 412aa of the output connection waveguide 412a. The optical multiplexer/demultiplexer 414ba optically connects the ring waveguide 413b and the straight waveguide 411n that configures the second branched path on the input connection waveguide 411. The optical multiplexer/demultiplexer 414bb optically connects the ring waveguide 413b and the curved waveguide 412ba of the output connection waveguide 412b. The optical multiplexers/demultiplexers 414aa, 414ab, 414ba, and 414bb are a 2×2 type that is a directional coupling type or an MMI type, for example.

The curvature radii of each of the curved waveguides of the input connection waveguide 411 and the output connection waveguides 412a and 412b are different from the curvature radii of the curved waveguides of the ring waveguides 413a and 413b. For example, the curvature radii of each of the curved waveguides of the input connection waveguide 411 and the output connection waveguides 412a and 412b are 250 μm. The curvature radii of the curved waveguides of the ring waveguides 413a and 413b are 412 μm. The length of the straight waveguide of the ring waveguide 413b is 1244 μm.

As for the curved waveguides 411b, 411c, 411e, 411h, and 411j of the input connection waveguide 411 to the ring waveguide 413a, the light guiding directions are counterclockwise or clockwise, the curvature signs are negative or positive, and the bending angles are 60 degrees or 90 degrees. The sum total of the products of the curvature signs and the bending angles of the curved waveguides 411b, 411c, 411e, 411h, and 411j is −270 degrees.

Meanwhile, the light guiding direction of the curved waveguide of the ring waveguide 413a is clockwise as indicated by an arrow, and the curvature sign is positive. The bending angle of the curved waveguide of the ring waveguide 413a is 360 degrees. Therefore, the sum total of the product of the curvature sign and the bending angle of the ring waveguide 413a is 360 degrees.

Furthermore, the light guiding direction of the curved waveguide 412aa of the output connection waveguide 412a is counterclockwise, the curvature sign is negative, and the bending angle is 90 degrees. Therefore, the sum total of the product of the curvature sign and the bending angle of the curved waveguide 412aa is −90 degrees.

As a result, the sum total of the products of the curvature signs and the bending angles of the curved waveguides 411b, 411c, 411e, 411h, 411j and 412aa and the sum total of the product of the curvature sign and the bending angle of the ring waveguide 413a have the same absolute value with opposite signs. Thereby, rotation of the polarization plane of light generated in the ring waveguide 413a and rotation of the polarization plane of light generated in the curved waveguides 411b, 411c, 411e, 411h, 411j and 412aa cancel each other out. As a result, regardless of whether input light L41 is in TE-polarization or TM-polarization, light L42 is output while securing a high polarization maintaining property.

Similarly, as for the curved waveguides 411b, 411c, 411e, 411l and 411m of the input connection waveguide 411 to the ring waveguide 413b, the light guiding directions are counterclockwise or clockwise, the curvature signs are negative or positive, and the bending angles are 60 degrees or 90 degrees. The sum total of the products of the curvature signs and the bending angles of the curved waveguides 411b, 411c, 411e, 411l and 411m is −90 degrees.

That is, the sum totals of the curvature signs and the bending angles of the curved waveguides in the first branched path and the second branched path are different from each other.

Meanwhile, the light guiding direction of the curved waveguide of the ring waveguide 413b is counterclockwise as indicated by an arrow, and the curvature sign is negative. The bending angle of the curved waveguide of the ring waveguide 413b is 360 degrees. Therefore, the sum total of the product of the curvature sign and the bending angle of the ring waveguide 413b is −360 degrees.

Furthermore, as for the curved waveguides 412ba, 412bc, 412be, 412bg, 412bi, and 412bk of the output connection waveguide 412b, the light guiding directions are counterclockwise or clockwise, the curvature signs are negative or positive, and the bending angles are 90 degrees or 180 degrees. The sum total of the products of the curvature signs and the bending angles of the curved waveguides 412ba, 412bc, 412be, 412bg, 412bi, and 412bk is 450 degrees.

As a result, the sum total of the products of the curvature signs and the bending angles of the curved waveguides 411b, 411c, 411e, 411l, 411m, 412ba, 412bc, 412be, 412bg, 412bi, and 412bk (−90+450=360) and the sum total of the product of the curvature sign and the bending angle of the ring waveguide 413b have the same absolute value with opposite signs. Thereby, rotation of the polarization plane of light generated in the ring waveguide 413b and rotation of the polarization plane of light generated in the curved waveguides 411b, 411c, 411e, 411l, 411m, 412ba, 412bc, 412be, 412bg, 412bi, and 412bk cancel each other out. As a result, regardless of whether the input light L41 is in TE-polarization or TM-polarization, light L43 is output while securing a high polarization maintaining property.

In the optical waveguide circuit 400, the curvature radii of each of the curved waveguides of the input connection waveguide 411 and the output connection waveguides 412a and 412b are different from the curvature radii of the ring waveguides 413a and 413b so that each of those can be set as an optimal value. Furthermore, since the waveguide lengths of the ring waveguides 413a and 413b are different from each other, it is possible to set different FSR. For example, it is possible to design FSR of the ring waveguide 413a to be 75 GHz and design FSR of the ring waveguide 413b to be 50 GHz. Furthermore, by setting the curvature radii of each of the curved waveguides of the input connection waveguide 411 and the output connection waveguides 412a and 412b as 250 μm, it is possible to decrease light loss through the waveguides and to reduce the size of the optical waveguide circuit 400. Furthermore, with the optical waveguide circuit 400, the circulating directions of light can be set to be opposite from each other for the ring waveguides 413a and 413b, so that design thereof may be highly flexible.

As described above, with the optical waveguide circuit 400, it is possible to implement both high flexibility in designing FSR and low bending loss while securing a high polarization maintaining property. Note that the curvature radii and the bending angles mentioned above are examples, and it is possible to set the values thereof freely in accordance with the required bending loss and FSR. Furthermore, in the optical waveguide circuit 400, one end of the input connection waveguide 411 and one ends of the output connection waveguides 412a and 412b are extended toward the same side face. Therefore, it is easily connected to an optical fiber array or another optical waveguide circuit.

As a fourth example, an optical waveguide circuit having the configuration of the optical waveguide circuit 400 was manufactured by the manufacturing method described above. The property of the manufactured optical waveguide circuit was measured, and FSR of a ring resonator configured with two ring waveguides was 75 GHz and 50.2 GHz. Furthermore, when TE-polarized light was input from an input connection waveguide and the polarization mode coupling amount was measured, a preferable value of −25 dB or less was acquired. Moreover, when curved waveguide parts of the input connection waveguide and the output connection waveguide were diced and the light loss thereof was measured, acquired was a preferable value of 0.95 dB/cm or less.

Note that the present disclosure is not limited by the above-described embodiments. For example, in the third and fourth embodiments, there may be three or more ring waveguides, two or more branch parts, and three or more branched paths. Furthermore, the present disclosure includes configurations acquired by combining each of the above-described structural elements as appropriate. Moreover, further effects and modifications may easily occur to those skilled in the art. Therefore, broader aspects of the present disclosure are not limited by the above-described embodiments but various changes are possible.

According to an embodiment, it is possible to implement both high flexibility in designing FSR of the ring resonator and low bending loss while securing a high polarization maintaining property.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An optical waveguide circuit comprising:
a ring waveguide;
an input connection waveguide;
an output connection waveguide; and
an optical multiplexing/demultiplexing part that optically connects the ring waveguide with the input connection waveguide, and that optically connects the ring waveguide with the output connection waveguide, wherein
at least one of the input connection waveguide and the output connection waveguide includes a plurality of curved waveguides,
a sum total of products of curvature signs and bending angles of the curved waveguides and a sum total of a curvature sign and a bending angle of the ring waveguide have a same absolute value with signs opposite to each other, and
rotation of a polarization plane of light generated in the ring waveguide and rotation of a polarization plane of light generated in the curved waveguides cancel each other out.

2. The optical waveguide circuit according to claim 1, wherein curvature radii of the curved waveguides and a curvature radius of the ring waveguide are different from each other.

3. The optical waveguide circuit according to claim 1, wherein an absolute value of the sum total of the products of the curvature signs and the bending angles of the curved waveguides is 360 degrees.

4. The optical waveguide circuit according to claim 1, wherein each of the curved waveguides has a curvature radius with which light loss through the waveguides is 1.0 dB/cm or less.

5. The optical waveguide circuit according to claim 1, wherein
the optical multiplexing/demultiplexing part includes two optical multiplexers/demultiplexers, and
one end of the input connection waveguide and one end of the output connection waveguide are extended toward a same side face.

6. The optical waveguide circuit according to claim 1, comprising a plurality of the ring waveguides, wherein
the input connection waveguide includes at least one branch part and a plurality of branched paths that are branched from the at least one branch part and optically connected to each of the ring waveguides,
the branched paths include two or more of the curved waveguides, and
sum totals of products of curvature signs and bending angles of the curved waveguides in each of the branched paths are equivalent with each other.

7. The optical waveguide circuit according to claim 1, comprising a plurality of the ring waveguides, wherein
the input connection waveguide includes at least one branch part and a plurality of branched paths that are branched from the at least one branch part and optically connected to each of the ring waveguides,
the branched paths include two or more of the curved waveguides, and
the ring waveguides include ring waveguides having light circulating directions different from each other.

8. The optical waveguide circuit according to claim 7, wherein sum totals of products of curvature signs and bending angles of the curved waveguides in each of the branched paths are different from each other.

9. The optical waveguide circuit according to claim 1, comprising a plurality of the ring waveguides, wherein
the ring waveguides include ring waveguides having waveguide lengths different from each other.

10. The optical waveguide circuit according to claim 1, wherein
when TE-polarized or TM-polarized light of single polarization is input from the input connection waveguide, a polarization mode coupling amount of light output from the output connection waveguide is −25 dB or less.

11. The optical waveguide circuit according to claim 1, wherein
the input connection waveguide, the ring waveguide, the output connection waveguide, and the optical multiplexing/demultiplexing part are formed with a core, and the core is a buried waveguide buried in a cladding.

12. The optical waveguide circuit according to claim 11, wherein a relative refractive-index difference of the core with respect to the cladding is 4.5% or more.

13. The optical waveguide circuit according to claim 11, wherein the core contains $ZrO_2$.

* * * * *